(12) United States Patent
Pohl et al.

(10) Patent No.: US 12,460,453 B2
(45) Date of Patent: Nov. 4, 2025

(54) CONTROL ASSEMBLY FOR A MOTOR VEHICLE LOCK SYSTEM

(71) Applicant: Brose Fahrzeugteile SE & Co. Kommanditgesellschaft, Bamberg, Bamberg (DE)

(72) Inventors: Florian Pohl, Ebersdorf (DE); Christian Herrmann, Großheirath (DE); David Rosales, Rochester Hills, MI (US)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 344 days.

(21) Appl. No.: 17/797,579

(22) PCT Filed: Feb. 2, 2021

(86) PCT No.: PCT/EP2021/052358
§ 371 (c)(1),
(2) Date: Aug. 4, 2022

(87) PCT Pub. No.: WO2021/156221
PCT Pub. Date: Aug. 12, 2021

(65) Prior Publication Data
US 2023/0068661 A1    Mar. 2, 2023

(30) Foreign Application Priority Data
Feb. 5, 2020    (DE) ..................... 10 2020 102 890.3

(51) Int. Cl.
*E05B 81/22*  (2014.01)
*E05B 63/14*  (2006.01)

(52) U.S. Cl.
CPC ............ *E05B 81/22* (2013.01); *E05B 63/143* (2013.01)

(58) Field of Classification Search
CPC ... B62D 33/07; Y10T 292/1082; E05B 81/22; E05B 81/14; E05B 63/143; E05B 83/04; E05B 81/20
See application file for complete search history.

(56) References Cited

U.S. PATENT DOCUMENTS

2018/0087298 A1*  3/2018  Strole ................... B62D 33/037
2019/0375467 A1* 12/2019  Tyagi ................. B62D 33/0273
(Continued)

FOREIGN PATENT DOCUMENTS

DE    19944554 A1    3/2001
DE    10359144 A1    8/2005
(Continued)

*Primary Examiner* — Christine M Mills
*Assistant Examiner* — Yahya Sidky
(74) *Attorney, Agent, or Firm* — Dickinson Wright PLLC

(57) ABSTRACT

A control assembly for a motor vehicle lock system including a first and a second motor vehicle lock are associated with a closure element of a motor vehicle, the motor vehicle locks each can be brought into a main locking position for a retaining engagement between a lock latch of the motor vehicle lock and a locking part and into an opened position, the motor vehicle lock system comprises a sensor assembly which determines sensor values for the respective positions of the motor vehicle locks, the first and the second motor vehicle lock each have a closing assembly, the motor vehicle lock system has at least one electric closing drive for the closing assemblies, the control assembly triggers a closing routine on fulfilment of a starting criterion by the sensor values.

19 Claims, 2 Drawing Sheets

(56) References Cited

U.S. PATENT DOCUMENTS

| | | | |
|---|---|---|---|
| 2020/0148283 A1* | 5/2020 | Robinson | B62D 33/03 |
| 2024/0209658 A1* | 6/2024 | Rosales | E05B 81/06 |

FOREIGN PATENT DOCUMENTS

| | | |
|---|---|---|
| DE | 102004043220 A1 | 3/2006 |
| DE | 102004050883 A1 | 4/2006 |
| DE | 102004060280 A1 | 6/2006 |
| DE | 102005048945 A1 | 4/2007 |
| DE | 102017101704 A1 | 8/2018 |
| DE | 102018116285 A1 | 1/2020 |
| JP | 2002129812 A | 5/2002 |

\* cited by examiner ated with one, for example, the same, closure element of a motor vehicle, and the motor vehicle locks each can be brought into a main locking position and optionally a pre-locking position for a retaining engagement between a lock latch of the motor vehicle lock and a locking part, and into an opened position. The motor vehicle lock system may include a sensor assembly which determines sensor values for the respective position of the motor vehicle locks.

CONTROL ASSEMBLY FOR A MOTOR VEHICLE LOCK SYSTEM

CROSS-REFERENCE TO RELATED APPLICATIONS

This application is the U.S. National Phase of PCT Application No. PCT/EP2021/052358 filed on Feb. 2, 2021, which claims priority to German Patent Application No. DE 10 2020 102 890.3, filed on Feb. 5, 2020, the disclosures of which are hereby incorporated in their entirety by reference herein.

TECHNICAL FIELD

The present disclosure relates to a control assembly for a motor vehicle lock system.

BACKGROUND

A motor vehicle lock system may include motor vehicle locks which may be associated with any closure element of a motor vehicle. In this regard, the term "closure element" is to be interpreted broadly. The term "closure element" encompasses, for example, a side door, a rear door, a tailgate, a trunk lid, a front hood, an engine hood, or the like. The closure element may be articulated on the body of the motor vehicle in the manner of a pivoting door or in the manner of a sliding door.

A comfort function of the motor vehicle lock system under discussion is the so-called "closing function", closing assemblies being provided for the implementation thereof. The closing assembly undertakes, for example, the motorized transfer of the closure element from a pre-locking position into a main locking position, such that the vehicle user or a drive assembly of the closure element is relieved of this last adjusting section which generally has to be carried out counter to a high door sealing pressure.

Motor vehicle lock systems having at least two motor vehicle locks are used, amongst other things, in the case of larger closure elements, such as side sliding doors or tailgates of vans and trucks, said motor vehicle locks being arranged, for example, on opposing sides of the closure element. The provision of the motor vehicle lock system with a closing function has also proved advantageous here, and the motor vehicle locks are each provided with a closing assembly which each bring about a closing of the respective motor vehicle lock independently of one another.

SUMMARY

One or more objects of the present disclosure is to design and to develop the control assembly for a motor vehicle lock system such that the implementation of the closing function is further improved.

According to one or more embodiments, the control assembly for a motor vehicle lock system being may include a first motor vehicle lock and a second motor vehicle lock. In principle, a plurality of motor vehicle locks are provided, and one of these motor vehicle locks is denoted as the "first" and another as the "second" motor vehicle lock. Further motor vehicle locks may also be provided.

The first and second motor vehicle locks may be associated with one, for example, the same, closure element of a motor vehicle, and the motor vehicle locks each can be brought into a main locking position and optionally a pre-locking position for a retaining engagement between a lock latch of the motor vehicle lock and a locking part, and into an opened position. The motor vehicle lock system may include a sensor assembly which determines sensor values for the respective position of the motor vehicle locks.

It is also assumed that the first and the second motor vehicle lock each have a closing assembly which is provided for closing the respective motor vehicle lock in one respective closing process and which acts on the lock latch and/or the locking part, and the motor vehicle lock system has at least one, such as in each case one, electric closing drive for the closing assemblies. The control assembly triggers a closing routine on fulfillment of a starting criterion by the sensor values, in which closing routine the control assembly controls the at least one closing drive.

A motor vehicle lock system with a plurality of motor vehicle locks there may be a need to design the closing of the individual motor vehicle locks in a manner which is relatively wear-resistant and also harmonious. According to the proposal, it has been identified that this is possible by coordinating the closing of the motor vehicle locks with one another via a common correspondingly designed control assembly.

In detail, it is proposed that the control assembly generates a specific control specification for the closing processes according to the sensor values and in accordance with a coordination specification, such that according to the coordination specification the closing process of the first motor vehicle lock and the closing process of the second motor vehicle lock are each dependent both on the position of the first motor vehicle lock and on the position of the second motor vehicle lock, and that the control assembly controls the at least one closing drive in accordance with the control specifications.

The coordination specification is a rule as to how the closing processes of the individual motor vehicle locks are to be performed relative to one another and according to the respective position of the motor vehicle locks. The coordination specification forms the basis of generating the control specification which in turn is representative of the path of the control and thus of the movement path in the respective closing process which is brought about by means of the at least one closing drive. The control specification, for example, is representative of the point in time at which the respective motor vehicle lock is to be moved during the closing process and at which speed. In the present case, the position of both the first and the second motor vehicle locks influences the generation of the control specification such that the closing of the respective motor vehicle lock may be adapted to the position of both motor vehicle locks.

The proposed solution may be advantageous if a limited mechanical coupling of the motor vehicle locks is provided via the closure element, for example due to the size and deformability of the closure element. Even in changeable mechanical conditions, for example in the case of wear or soiling, a coordination of the closing processes may be reliably achieved, since the positions of both motor vehicle locks are taken into consideration in the control via the sensor values.

In one or more embodiments, the coordination specification predetermines a substantially simultaneous start of the closing of the motor vehicle locks, whereby a closing function which acts in a relatively harmonious manner is implemented. Alternatively, the coordination specification may predetermine a chronologically consecutive closing of the motor vehicle locks, and for example a closing sequence takes place which may be advantageous for the progression of the locking movement of the adjusting element. If, according to a further embodiment, the closing of one of the motor vehicle locks starts after the end of the closing of another of the motor vehicle locks, the power consumption of the closing drive is substantially reduced.

The starting criterion may be defined according to another embodiment, in that at least one of the motor vehicle locks, preferably all of the motor vehicle locks, has or have reached a predetermined starting position, for example the pre-locking position. A high degree of reliability of the closing function is associated therewith.

The reliability of the closing function may be additionally increased in the further embodiment, in that according to the coordination specification the control specifications have a predetermined waiting time. Thus it may be ensured that, at the start of the closing routine, the closure element is sufficiently locked on all of the motor vehicle locks.

One or more embodiments may be advantageous for the coordination of the motor vehicle locks, according to which the coordination specification relates to the speed of the closing of the motor vehicle locks. In this case, amongst other things, different mechanical boundary conditions of the individual motor vehicle locks are taken into consideration in the control. As an example, the coordination specification predetermines substantially the same respective speed of the closing processes of the motor vehicle locks relative to one another.

One or more embodiments of the control assembly may be designed for determining the closing speed. If a time period covered between reaching two predetermined positions of the respective motor vehicle lock is used, the closing speed may also be determined without additional sensor systems. Movement sensor values of a movement sensor assembly may also be used.

In a further embodiment, the control assembly undertakes the control of the at least one closing drive as a function of the path of the respective speed in at least one previously carried out closing routine. The control undertaken regarding the coordination of the motor vehicle locks may be further improved thereby, and for example changes to the mechanical boundary conditions, for example due to wear or soiling of the motor vehicle locks, may also be compensated in the control.

According to one or more embodiments, the control assembly may trigger an error routine on fulfillment of an error criterion by the sensor values in order to take into account the safety aspects of the closing function. In the error routine, the closing drive is controlled for returning the motor vehicle locks in the direction of the opened position, and the coordination specification may also relate to the return.

The closure element may include an electric drive assembly for adjusting the closure element, the electric drive being controlled by the control assembly in a closing routine in the closing direction of the closure element. A further comfort function may be implemented by the motorized locking, said further comfort function being advantageously combined here with the coordination of the closing of the motor vehicle locks.

According to another embodiment, the control assembly may also control the drive assembly in the error routine according to a return specification in the opening direction of the closure element and may be subsequently trigger a further locking routine. In the presence of an error case, for example when not all of the main latching positions of the motor vehicle locks are reached during the closing process, a renewed opening and locking maneuver is carried out, therefore, in order to increase the comfort.

According to yet another embodiment, the aforementioned motor vehicle lock system which has a proposed control assembly. Reference should be made to all of the embodiments relative to the proposed control assembly.

According to another embodiment, which also has independent importance, a method for operating a motor vehicle lock system is provided. The method is carried out, for example, by means of the proposed motor vehicle lock system. In this regard, reference should also be made to all of the embodiments relative to the proposed control assembly and relative to the proposed motor vehicle lock system.

BRIEF DESCRIPTION OF THE DRAWINGS

The invention is described in more detail hereinafter with reference to a drawing which shows merely one exemplary embodiment. In the drawing.

DETAILED DESCRIPTION

Figure 1:
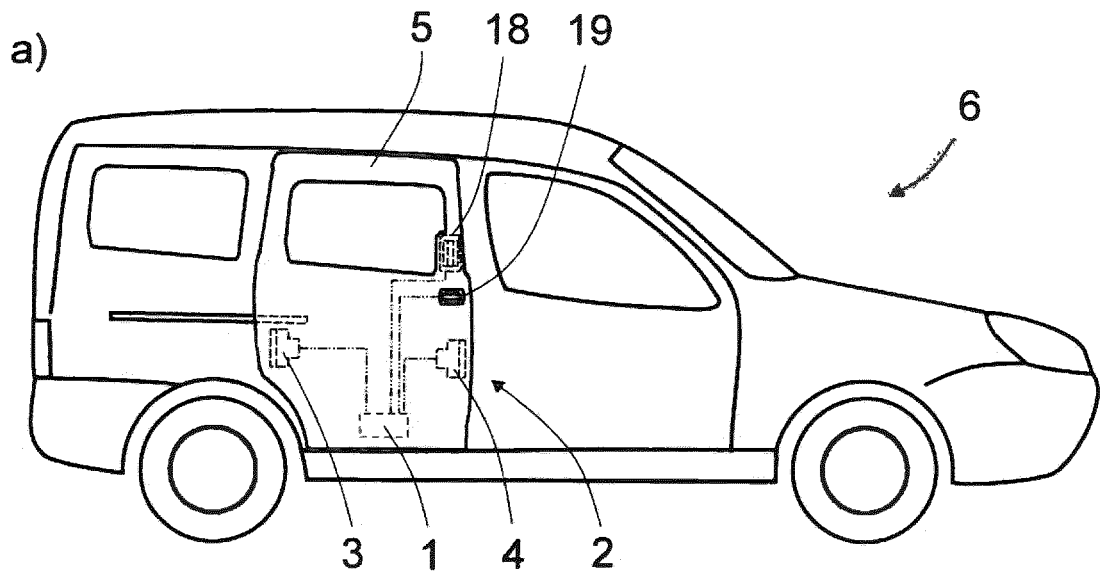
FIG. 1 shows a) a side view and b) a rear view of motor vehicles with a proposed motor vehicle lock system having a proposed control assembly.
Figure 1:
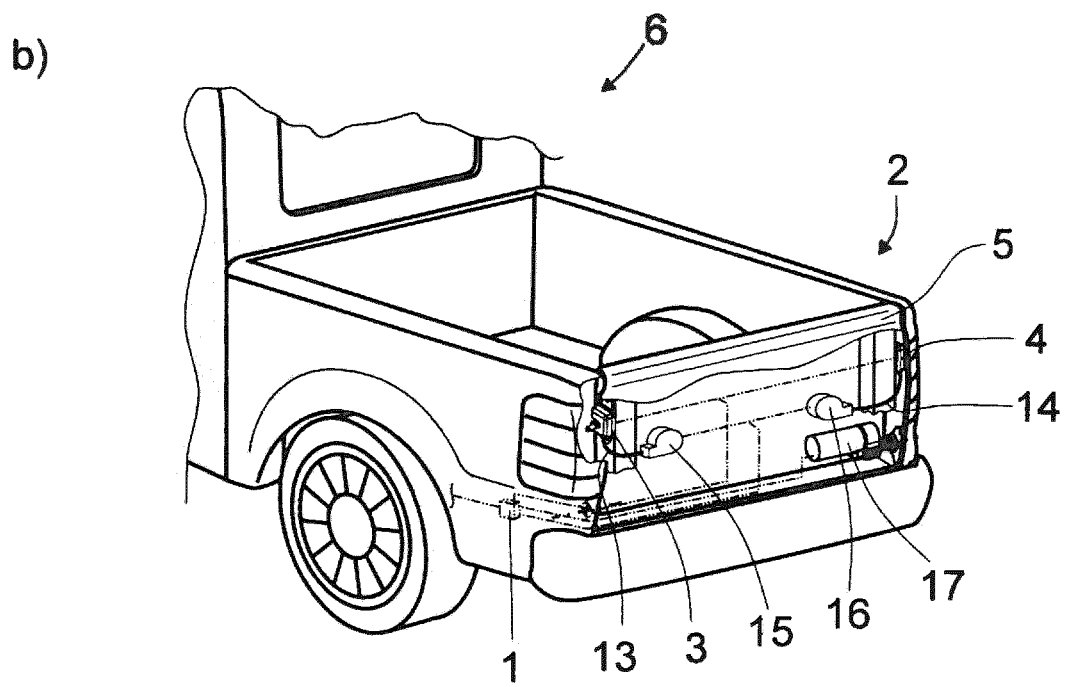

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The invention relates to a control assembly 1 for a motor vehicle lock system 2. The motor vehicle lock system 2 is provided with at least two motor vehicle locks 3, 4 which are denoted as the first motor vehicle lock 3 and the second motor vehicle lock 4. In the embodiments shown in FIG. 1 exactly two motor vehicle locks 3, 4 are provided.

Corresponding proposed motor vehicle lock systems 2 may be associated with any closure element 5 of a motor vehicle 6. Regarding the further understanding of the term "closure element", reference should be made to the introductory part of the description. In the exemplary embodiments which are shown in this regard, the closure element 5 of FIG. 1*a*) is a side door of the motor vehicle 6 and the closure element 5 of FIG. 1*b*) is a tailgate of the motor vehicle 6. All of these embodiments accordingly apply to all other types of closure elements. The first and second motor vehicle lock 3, 4 are assigned in this case to the same closure element 5.

As an example, the first and second motor vehicle locks 3, 4, as shown in FIG. 1, are arranged on opposing sides of the closure element 5. A plurality of motor vehicle locks 3, 4, however, may also be arranged together on one side of the closure element 5.

For generating the retaining action between the closure element 5 and the body of the motor vehicle 6, the motor vehicle locks 3, 4 in each case have lock latches 7, 8, wherein in each case the motor vehicle locks may be brought into a main locking position and optionally a pre-locking position for a retaining engagement between the lock latch 7, 8 and a locking part 9, 10, here as an example, in the form of the respective striker. As an example, the lock latch 7, 8 is designed to be pivotable about a lock latch axis. The lock latch 7, 8 cooperates in a manner known per se with the respective locking part 9, 10 in order to hold the closure element 5 in the respective locked position. Here as an example, the lock latches 7, 8 are arranged on the closure element 5, whilst the locking parts 9, 10 are arranged on the body of the motor vehicle 6. This may also be provided in reverse.

For implementing the above retaining action it may further be provided that the lock latch 7, 8 is assigned in a manner known per se a locking pawl assembly, not shown here. The locking pawl assembly has at least one locking pawl which locks the lock latch 7, 8 in the main locking position and optionally in the pre-locking position.

The motor vehicle locks 3, 4 are additionally able to be brought into an opened position in which the lock latch 7, 8 releases the locking part 9, 10, and an opening of the closure element 3 is permitted.

The motor vehicle lock system 2, here the motor vehicle locks 3, 4, have a sensor assembly 11, 12 which determines the sensor values for the position of the respective motor vehicle lock 3, 4. In this case, the sensor values may be representative of one or more positions of the respective motor vehicle lock 3, 4, for example of the main locking position, the pre-locking position, the opened position and/or intermediate positions thereof. As an example, the sensor assembly 11, 12 is associated with the lock latches 7, 8. The sensor assembly 11, 12 is actuated, for example, directly or indirectly by the lock latch 7, 8 when the lock latch 7, 8 assumes a pivoting angle about the lock latch axis, which corresponds to the main locking position, the pre-locking position, the opened position and/or intermediate positions thereof. Similarly, the sensor assembly 11, 12 may also be associated with the locking part 9, 10 and/or the closure element 5. The sensor assembly 11, 12, for example, has electrical switches which may be actuated, for example, by direct or indirect contact with one of the aforementioned elements.

The proposed motor vehicle lock system 2 further provides that the first and the second motor vehicle lock 3, 4 in each case have a closing assembly 13, 14 which is provided for closing the respective motor vehicle lock 3, 4 in one respective closing process. As a result, a closing function is implemented, relative to which the introductory embodiments should be referred to. As an example, the closing assembly 13, 14 acts on the lock latch 7, 8, wherein here the closing assembly 13, 14 brings about a pivoting of the lock latch 7, 8 about the lock latch axis. The closing assembly 13, 14 may also act on the locking part 9, 10 and may be designed, for example, for a translation and/or pivoting of the locking part 9, 10. The closing assembly 13, 14 may be a mechanical assembly of levers, pulls, rod assemblies, or the like, which is designed for the transmission of force from at least one closing drive 15, 16 to the lock latch 7, 8 and/or the locking part 9, 10.

The motor vehicle lock system 2 also has the aforementioned at least one closing drive 15, 16 for the closing assemblies 13, 14. As shown in FIG. 1b) according to another embodiment, in each case a closing drive 15, 16 is provided here for the closing assemblies 13, 14.

According to an alternative embodiment, only a single closing drive may be provided for a plurality of closing assemblies 13, 14. The closing drive 15, 16 is designed as an electric drive and may include at least one rotary electric motor. The closing drive 15, 16 acts, for example, on pulls and/or rod assemblies of the closing assembly 13, 14.

The control assembly 1 performs functions for the motor vehicle lock system 2 in terms of control technology and is provided, for example, with a corresponding control electronics system. The control assembly 1 controls the at least one closing drive 15, 16 in order to provide the aforementioned closing function. To this end, it is provided that the control assembly 1 controls the at least one closing drive 15, 16 in a closing routine on fulfillment of a predetermined starting criterion by the sensor values. The control assembly 1 continuously monitors, for example, the sensor values as to whether the starting criterion is fulfilled, which may be defined using the position of the motor vehicle locks 3, 4 as described in more detail below.

The control assembly 1 may generate a specific control specification for the closing processes according to the sensor values and in accordance with a coordination specification, that according to the coordination specification the closing process of the first motor vehicle lock 3 and the closing process of the second motor vehicle lock 4 are each dependent both on the position of the first motor vehicle lock 3 and on the position of the second motor vehicle lock 4, and that the control assembly 1 controls the at least one closing drive 15, 16 in accordance with the control specifications.

Figure 2:
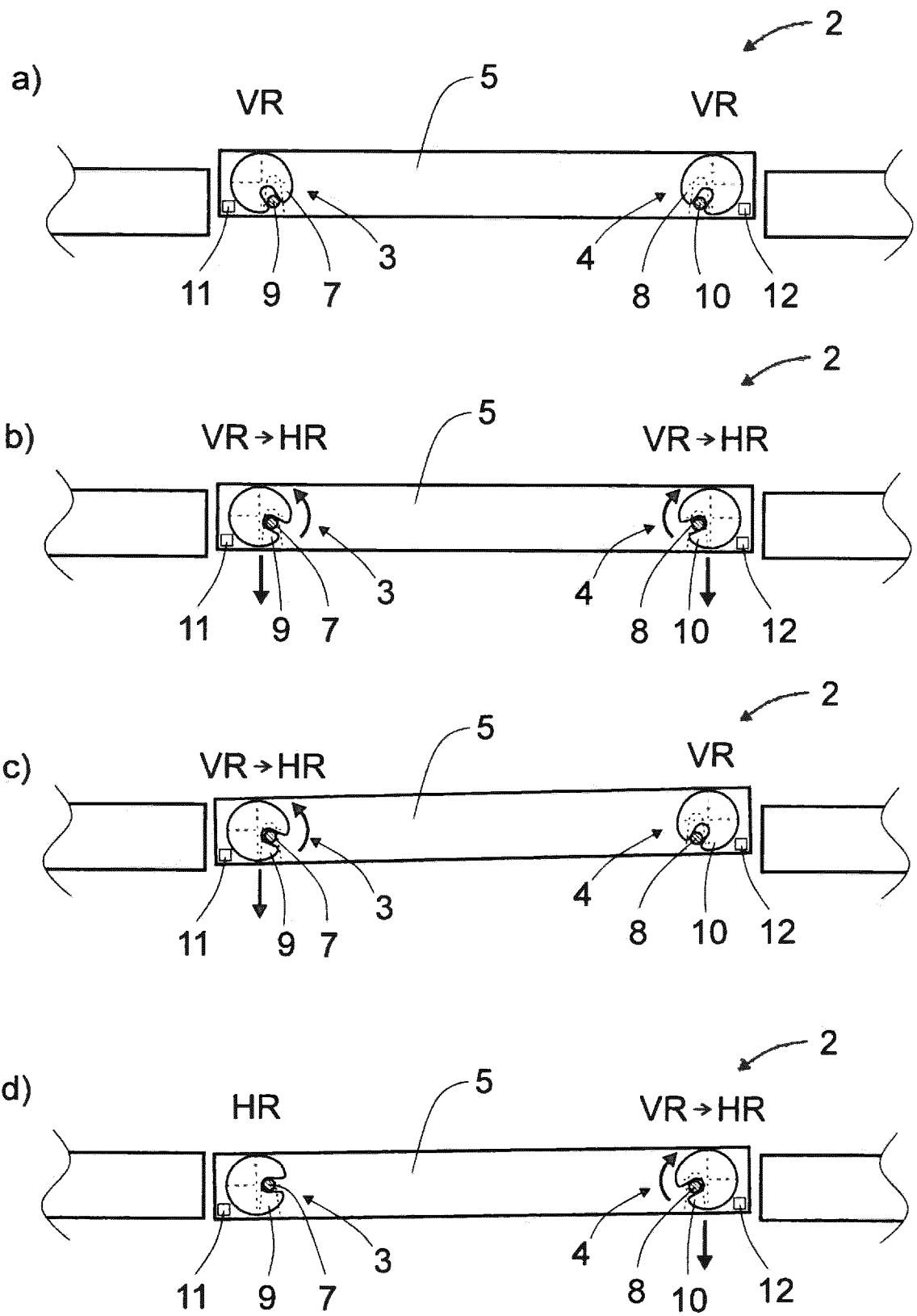
FIG. 2 shows schematic sequences of the closing routine using a plan view of the motor vehicle lock system of FIG. 1.

According to another embodiment, the coordination specification predetermines a substantially simultaneous start of the closing of the motor vehicle locks 3, 4. "Substantially simultaneous" is understood to mean that the closing of the motor vehicle locks 3, 4 starts at the same time—apart from unavoidable delays caused, for example, by control technology or mechanical tolerances in the force chain. If the starting criterion, as shown schematically in FIG. 2a), is fulfilled by both motor vehicle locks 3, 4 reaching the pre-locking position (VR), the closing of the motor vehicle locks 3, 4 starts by the pivoting of the lock latches 7, 8, shown in FIG. 2b), at the same time in the direction of the main locking position (HR), so that the closure element 5 is transferred uniformly into the main locking position counter to the door sealing pressure. The closing may be carried out as a function of the position of both motor vehicle locks 3, 4, and the closing is triggered at the same time, for example, only when both motor vehicle locks 3, 4 reach the predetermined starting positions.

In an alternative embodiment, the coordination specification predetermines a chronologically consecutive closing of the motor vehicle locks 3, 4. Starting from the situation in FIG. 2a), it is shown in FIG. 2c) that initially the motor vehicle lock 3 is closed. The closing shown in FIG. 2d) of the motor vehicle lock 4 only starts subsequently. In the coordination specification, therefore, a movement sequence may be predetermined for the motor vehicle locks 3, 4 and thus for the closure element 5. This may be advantageous, as an example, in closure elements 5 such as sliding doors or the like, which perform a combined pivoting and sliding movement with the locking. This combined pivoting and sliding movement may be assisted by the coordinated closing of the motor vehicle locks 3, 4.

In principle, according to the coordination specification the closing of the individual motor vehicle locks 3, 4 may chronologically overlap. In the embodiment which is shown in FIGS. 2c) and d) and which may be in this regard, however, it is provided that the closing of one of the motor vehicle locks 4 starts after the end of the closing of another of the motor vehicle locks 3. Thus it may be ensured that the at least one closing drive 15, 16 operates only one of the closing assemblies 13, 14 at a time in the closing routine.

As an example, the starting criterion is defined in that at least one of the motor vehicle locks 3, 4 has reached a predetermined starting position. The starting position is a position of the motor vehicle locks 3, 4 in which an engagement between the lock latch 7, 8 and the closing part 9, 10 is possible, such that the closing function is provided with a high degree of reliability when the closing routine is triggered.

As an example, the starting criterion is defined in that all of the motor vehicle locks 3, 4 have reached the predetermined starting position, so that the reliability is further increased. The starting position is, as an example, the aforementioned pre-locking position. The starting criterion may also be defined in that at least one of the motor vehicle locks 3, 4, for example a predetermined minimum number of motor vehicle locks, has reached the predetermined starting position. Should a motor vehicle lock not reach the starting position, for example, the closing functions of the remaining motor vehicle locks 3, 4 are able to ensure that this motor vehicle lock also reaches the starting position.

According to a further embodiment, according to the coordination specification the control specifications have a predetermined waiting time. The control assembly 1 controls the at least one closing drive 15, 16 on fulfillment of the starting criterion, thus only after passing a predetermined waiting time. The waiting time is predetermined, for example, as a function of the speed of the closure element 5 in a motorized closing routine.

According to another embodiment, the coordination specification relates to the respective speed of the closing of the motor vehicle locks 3, 4. The speed of the closing process is understood to mean, for example, the speed of the closure element 5 on the respective motor vehicle lock 3, 4, the speed of the lock latch 7, 8 and/or of the closing part 9, 10 during the closing process. As an example, the coordination specification predetermines substantially the same respective speed of the closing of the motor vehicle locks 3, 4 relative to one another. For example, as a result, in the motor vehicle locks 3, 4, with the simultaneous starting of the closing process shown in FIG. 2), the closing is also simultaneously terminated, for example in order for the movement of the closure element 3 to be particularly uniform counter to the door sealing pressure in the closing routine.

The control assembly 1 may determine the respective speed of the closing process in different ways. As an example, this takes place using the sensor values, for example using a time period covered between reaching two predetermined positions of the respective motor vehicle lock 3, 4. Here as an example, the sensor assemblies 11, 12 detect when the respective motor vehicle lock 3, 4 assumes the main locking position and the pre-locking position. During the closing process, the control assembly determines the time period which is required in order to transfer the respective motor vehicle lock 3, 4 from the pre-locking position into the main locking position. This time period may be used as a measurement of the speed of the closing process. As an example, according to an aforementioned embodiment, the coordination specification predetermines that substantially the same respective speed of the closing process and thus the same time period are maintained for transferring the motor vehicle locks 3, 4 from the pre-locking position into the main locking position.

In a further embodiment, the control assembly 1 determines the respective speed of the closing process using a drive variable of the at least one closing drive 15, 16. As an example, the drive variable is the drive voltage, the drive current or variables of the respective closing drive 15, 16 dependent thereon. In another embodiment, the speed is determined using the commutator ripple of the drive voltage in a drive motor of the respective closing drive 15, 16 designed as a rotary DC motor.

The motor vehicle lock system 1 may also have a movement sensor assembly, not shown here. The control assembly 1 may determine the respective speed of the closing process using movement sensor values of the movement sensor assembly. The movement sensor assembly is, for example, associated with the closing drive 15, 16 of the respective closing assembly 13, 14 and/or the respective motor vehicle lock 3, 4, for example the lock latch 7, 8 and/or the locking part 9, 10. As an example, the movement sensor assembly is at least one incremental path sensor, for example a Hall sensor, which is designed for example for determining the rotational speed of a drive motor of the closing drive 15, 16.

In principle, the control device 1 may regulate the control of the at least one closing drive 15, 16 using a target movement specification, for example a target speed specification which may be part of the coordination specification.

In one embodiment, the control assembly 1 performs the control of the at least one closing drive 15, 16 as a function of the path of the respective speed in at least one previously carried out closing routine which may be implemented, for example, in a coordination specification. For example, according to the aforementioned embodiment, the time which is covered between reaching two predetermined positions of the respective motor vehicle lock 3, 4 is determined in the previously carried out closing routine. For subsequent closing routines, the control of the at least one closing drive 15, 16 may be adapted according to the coordination specification. Thus the control assembly 1 "learns" to adapt the control of the at least one closing drive 15, 16 in order to reach a predetermined speed. As an example, it is achieved thereby that the coordination specification may be maintained even under changing mechanical boundary conditions, and a complex regulation of the control of the at least one closing drive 15, 16 is not necessarily required.

In a further embodiment, the control assembly 1 triggers an error routine on fulfillment of an error criterion. As an example, the sensor values are monitored for the fulfillment of the error criterion. In the error routine, the at least one closing drive is controlled for returning the motor vehicle locks in the direction of the opened position. Thus the locking part 9, 10 may be released again and the closing process interrupted, for example, in order to prevent the closure element 5 from jamming. In the error routine, the control assembly 1 controls the at least one closing drive 15, 16 such that the closing assemblies 13, 14 bring about a return of the motor vehicle locks 3, 4 according to the coordination specification.

In this case, it may be provided in turn that the coordination specification predetermines a substantially simultaneous start of the return of the motor vehicle locks 3, 4, or that the coordination specification predetermines a chronologically consecutive return of the motor vehicle locks 3, 4. As an example, the return of one of the motor vehicle locks 3, 4 starts after the end of the return of another of the motor vehicle locks 3, 4. Reference should be made to the above embodiments relative to the coordination specification regarding the closing process.

As an example, the error criterion is at least partially defined in that at least one of the motor vehicle locks 3, 4 has reached the predetermined starting position, for example the aforementioned pre-locking position, and the fulfillment of the starting criterion is absent, for example if the starting criterion is defined in that all of the motor vehicle locks have reached a predetermined starting position. In this situation, a reliable closing of all motor vehicle locks 3, 4 is not readily guaranteed, so that the triggering of the aforementioned error routine is advantageous.

According to a further embodiment, the control assembly 1 obtains an obstacle detection signal of the closure element 3 and the error criterion is at least partially defined in that the obstacle detection signal fulfills a predetermined obstacle criterion. The obstacle may be, for example, an object located in the adjusting region of the closure element, and there is the risk that a jamming of the object and/or a collision of the closure element 3 with the object is associated with a closing of the motor vehicle locks 3, 4. In one embodiment, the closure element has an obstacle sensor assembly which determines the obstacle detection signal. Reference should be made to the methods already known from the prior art for obstacle detection.

According to a further embodiment, not shown here, the closure element 5 has an electric drive assembly for adjusting the closure element 5, and the control assembly 1 controls the drive assembly in a locking routine in the locking direction of the closure element 5. As an example, at least one actuating element is provided for the drive assembly, for example an inner actuating element 18 and an outer actuating element 19, which is connected to the control assembly 1 in terms of control technology. The locking routine is triggered upon the detection of an operator event via the actuating element. As an example, the control of the drive assembly is carried out until the fulfillment of the starting criterion, so that the described coordinated closing of the motor vehicle locks 3, 4 is triggered. Alternatively, the control of the drive assembly may be undertaken until the end of the closing of the motor vehicle locks 3, 4 so that the drive assembly assists the at least one closing drive 15, 16.

It is also particularly advantageous if in the error routine the control assembly 1 controls the drive assembly in the opening direction of the closure element 5 according to an opening specification. If, for example, an obstacle criterion is fulfilled relating to a jamming of the object, this object may be released again thereby. As already discussed, it is also possible to predetermine the error criterion, relative to the starting criterion being absent for the closing process. If a further locking routine is subsequently triggered for control in the opening direction, a renewed attempt for implementing the closing function may be carried out thereby.

According to another embodiment, which has independent importance, the above-described motor vehicle lock system 2 as described herein. The motor vehicle lock system 2 may include a proposed control assembly 1. Reference should be made to all of the embodiments relative to the proposed control assembly 1.

According to further teaching, which also has independent importance, a method for operating a motor vehicle lock system 2 as described herein. Reference is made to the above embodiments relative to the motor vehicle lock system 2. The method may comprise, for example, all of the method steps described in combination with the control assembly 1, the motor vehicle lock system 2 and the closure element 3.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMBERS

1 control assembly
2 motor vehicle lock system
3 motor vehicle locks
4 motor vehicle locks
5 closure element
6 motor vehicle
7 lock latch
8 lock latch
9 locking part
10 closing part
11 sensor assemblies
12 sensor assembly
13 closing assembly
14 closing assembly
15 closing drive
16 closing drive
18 inner actuating element
19 outer actuating element While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A control assembly for use in a motor vehicle lock system provided with a first motor vehicle lock and a second motor vehicle lock each associated with a closure element of a motor vehicle and configured to move to a main locking position, in which a lock latch of the first and second motor vehicle locks engages a locking part to retain the closure element, and an opened position, wherein the motor vehicle lock system includes a sensor assembly configured to determine sensor values indicative of a number of positions of the first and second motor vehicle locks, wherein the first and the second motor vehicle locks each include a closing assembly, wherein the closing assembly of the first and second motor vehicle locks is configured to perform a number of closing processes, in which the closing assembly of the first and second motor vehicle locks act on at least one of the lock latch of the first and second motor vehicle locks and the locking part, wherein the motor vehicle lock system includes at least one electric closing drive configured to operate the closing assemblies, the control assembly configured to:

perform a closing routine to control the at least one closing drive, in response to fulfillment of a starting criterion by the sensor values, wherein the control assembly is further configured to generate a control specification for each of the number of closing processes according to the sensor values and in accordance with a coordination specification, wherein a first motor vehicle lock closing process of the number of closing processes and a second motor vehicle lock closing process of the number of closing processes are based on the coordination specification, wherein the closing process of the first motor vehicle lock and the closing process of the second motor vehicle lock are each based on a position of the first motor vehicle lock and on a position of the second motor vehicle lock, wherein the control assembly is configured to control the at least one closing drive based on the control specifications, and wherein the starting criterion is fulfilled in response to at least one of the first and second motor vehicle locks reaching a predetermined starting position.

2. The control assembly of claim 1, wherein the coordination specification predetermines a substantially simultaneous start of the closing processes of the first and second motor vehicle locks, or the coordination specification predetermines chronologically consecutive closing processes of the motor vehicle locks.

3. The control assembly of claim 1, wherein according to the coordination specification the control specification includes a predetermined waiting time, provided between the fulfillment of the starting criterion and a start of the closing process.

4. The control assembly of claim 1, wherein the coordination specification relates to speed of the closing processes of the first and second motor vehicle locks.

5. The control assembly of claim 4, wherein the control assembly determines the speed of the closing processes based on the sensor values.

6. The control assembly of claim 4, wherein the control assembly determines the speed of the closing processes based on a drive variable of the at least one closing drive, and/or the control assembly determines the speed of the number of closing processes using movement sensor values of a movement sensor assembly of the motor vehicle lock system.

7. The control assembly of claim 4, the coordination specification defines a first speed of the closing process for the first motor vehicle lock and a second speed of the closing process for the second motor vehicle lock, wherein the first and second speeds are substantially the same.

8. The control assembly of claim 5, wherein the speed is based on a time period extending between the first and second motor vehicle locks move between two predetermined positions.

9. The control assembly of claim 1, wherein in the closing routine the control assembly is configured to trigger an error routine in response to fulfillment of an error criterion, wherein during error routine, the control assembly is configured to control the at least one closing drive to return the first and second motor vehicle locks in a direction towards the opened position.

10. The control assembly of claim 1, wherein the control assembly is configured to control the at least one closing drive based on a path of a respective speed in at least one previous closing routine.

11. The control assembly of claim 9, wherein the error criterion is at least partially fulfilled in response to the control assembly receiving an obstacle detection signal which fulfills a predetermined obstacle criterion.

12. The control assembly of claim 9, wherein the coordination specification predetermines a substantially simultaneous start of the return of the first and second motor vehicle locks, or the coordination specification predetermines a chronologically consecutive return of the first and second motor vehicle locks.

13. The control assembly of claim 9, wherein the error criterion is at least partially fulfilled in response to at least one of the first and second motor vehicle locks reaching a predetermined starting position, and absence of the fulfillment of the starting criterion within a predetermined time period.

14. The control assembly of claim 1, wherein the closure element includes an electric drive assembly configured to adjust the closure element, wherein the control assembly is configured to control the electric drive assembly during a locking routine, in which the control assembly commands the electric drive assembly to move the closure element in a locking direction.

15. The control assembly of claim 14, wherein during an error routine the control assembly commands the electric drive assembly to move the closure element in an opening direction based on an opening specification.

16. A motor vehicle lock system for use in a motor vehicle provided with a body and a closure element, the motor vehicle lock system comprising:

a first motor vehicle lock;

a second motor vehicle lock, the first and second motor vehicle locks each associated with a closure element of a motor vehicle and configured to move to a main locking position, in which a lock latch of the first and second motor vehicle locks engage a first and second locking part, respectively, to retain the closure element to a body of the motor vehicle, and an opened position wherein the first and second motor vehicle locks each include a closing assembly configured to perform a closing process, in which close the closing assembly cooperates with the lock latch of the first and second motor vehicle locks or;

a sensor assembly configured to determine sensor values indicative of a number of positions of the first and second motor vehicle locks;

an electric closing drive configured to power closing assemblies of the first and second motor vehicle locks; and the control assembly of claim 1.

17. The control assembly of claim 1, wherein the closing process of one of the first and second motor vehicle locks starts after an end of the closing process of the other of the first and second motor vehicle locks.

18. The control assembly of claim 1, wherein the predetermined starting position is a pre-locking position, in which a lock latch of at least one of the first and second motor vehicle locks engage and retain the locking part.

19. A method of operating a motor vehicle lock system provided with a first motor vehicle lock and a second motor vehicle lock each associated with a closure element of a motor vehicle and configured to move to a main locking position, in which a lock latch of the first and second motor vehicle locks engages a locking part to retain the closure element, and an opened position, wherein the motor vehicle lock system includes a sensor assembly configured to determine sensor values indicative of a number of positions of the first and second motor vehicle locks, wherein the first and the second motor vehicle locks each include a closing assembly, wherein the closing assembly of the first and second motor vehicle locks is configured to perform a number of closing processes, in which the closing assembly of the first and second motor vehicle locks act on at least one of the lock latch of the first and second motor vehicle locks and the locking part, wherein the motor vehicle lock system includes at least one electric closing drive configured to operate the closing assemblies, the method comprising:

generating, by a control assembly, a control specification for the number of closing processes, the control specification based on sensor values and a coordination specification, executing, by the control assembly, a closing process of the first motor vehicle lock in accordance with the coordination specification;

executing, by the control assembly, a closing process of the second motor vehicle lock in accordance with the coordination specification, wherein the closing process of the first motor vehicle lock and the closing process of the second motor vehicle lock are each based on a position of the first motor vehicle lock and a position of the second motor vehicle lock, wherein in accordance with the coordination specification the closing process of the first motor vehicle lock and the closing process of the second motor vehicle lock are each dependent both on the position of the first motor vehicle lock and on the position of the second motor vehicle lock;

controlling, by the control assembly, the at least one closing drive in accordance with the control specifications in response to fulfillment of a starting criterion by the sensor values; and wherein the starting criterion is fulfilled in response to at least one of the first and second motor vehicle locks reaching a predetermined starting position.

* * * * *